US012656724B2

(12) United States Patent
Matsuzaki

(10) Patent No.: US 12,656,724 B2
(45) Date of Patent: Jun. 16, 2026

(54) MEDIUM CONVEYANCE APPARATUS AND RECORDING APPARATUS

(71) Applicant: SEIKO EPSON CORPORATION, Tokyo (JP)

(72) Inventor: Kazutoshi Matsuzaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/604,568

(22) Filed: Mar. 14, 2024

(65) Prior Publication Data

US 2024/0310777 A1 Sep. 19, 2024

(30) Foreign Application Priority Data

Mar. 17, 2023 (JP) ................................ 2023-042916

(51) Int. Cl.
*G03G 21/16* (2006.01)
*G03G 15/00* (2006.01)

(52) U.S. Cl.
CPC ..... *G03G 21/1638* (2013.01); *G03G 15/6555* (2013.01)

(58) Field of Classification Search
CPC .......... G03G 21/1633; G03G 15/6514; G03G 15/0142; G03G 15/6573; G03G 2221/169; G03G 21/1638; G03G 2215/0035
See application file for complete search history.

(56) References Cited

U.S. PATENT DOCUMENTS

2006/0127129 A1* 6/2006 Jung .................. G03G 21/1671 399/111
2009/0142098 A1* 6/2009 Shin ..................... G03G 15/657 399/124
2012/0082478 A1* 4/2012 Wang ................ G03G 15/2035 399/110
2021/0132537 A1 5/2021 Takagi

FOREIGN PATENT DOCUMENTS

JP 2021-070556 A 5/2021

* cited by examiner

*Primary Examiner* — Jessica L Eley
(74) *Attorney, Agent, or Firm* — WORKMAN NYDEGGER

(57) ABSTRACT

A medium conveyance apparatus includes an inner door openable and closable with respect to an apparatus body, an outer door located on an outer side of the inner door and openable and closable with respect to the apparatus body. One of the inner door and the outer door includes a contact protruding part. The other of the inner door and the outer door includes a contact target part configured to come into contact with the contact protruding part. The contact protruding part and the contact target part are disposed forming a gap in the region between the inner door and the outer door in a state where the contact protruding part and the contact target part are in contact with each other when the outer door is rotated in a closing direction with the inner door open.

8 Claims, 11 Drawing Sheets

MEDIUM CONVEYANCE APPARATUS AND RECORDING APPARATUS

The present application is based on, and claims priority from JP Application Serial Number 2023-042916, filed Mar. 17, 2023, the disclosure of which is hereby incorporated by reference herein in its entirety.

BACKGROUND

1. Technical Field

The present disclosure relates to a medium conveyance apparatus and a recording apparatus.

2. Related Art

There is known a medium conveyance apparatus that includes an outer door and an inner door, and in which the medium jam occurred in the conveyance path located inside the inner door can be dealt with by opening the outer door and also the inner door. With the structure including the outer door and inner door, both doors are closed after the medium jam is dealt with. In this case, if the outer door is closed with the inner door open, the outer surface of the inner door and the inner surface of the outer door may rub by coming into contact with each other.

In the outer surface of the inner door and the inner surface of the outer door, medium support conveying members, such as a driving roller and a driven roller paired with the driving roller to convey the medium, making up a conveyance path for conveying the medium are disposed in some cases, for example. More specifically, the driving roller is disposed at one surface, and the driven roller is disposed at the other surface.

In such a structure, one or both of the outer surface of the inner door and the inner surface of the outer door may be damaged due to the "contact" and "rubbing". Alternatively, when the medium conveyance supporting member such as the driving roller and the driven roller is disposed, one or both thereof may be damaged.

An example of such an apparatus is the apparatus disclosed in JP-A-2021-70556. JP-A-2021-70556 does not describe or suggest the consideration for the damage.

As described above, in the case of the known structures, in the structure including the outer door and the inner door, if the outer door is closed with the inner door open after dealing with the medium jam, the outer surface of the inner door and the inner surface of the outer door may come into contact with each other and rub against each other, and one or both of the outer surface of the inner door and the inner surface of the outer door may be damaged. Alternatively, the medium support conveying member may be damaged when disposed.

SUMMARY

To solve the above-mentioned problems, a medium conveyance apparatus according to the present disclosure includes an inner door openable and closable with respect to an apparatus body, an outer door located on an outer side of the inner door and openable and closable with respect to the apparatus body, and a first conveyance path formed in a region between the inner door and the outer door in a state where the inner door and the outer door are closed, the first conveyance path being configured to convey a medium, in which one of the inner door and the outer door includes a contact protruding part, the other of the inner door and the outer door includes a contact target part configured to come into contact with the contact protruding part, and the contact protruding part and the contact target part are disposed forming a gap in the region between the inner door and the outer door in a state where the contact protruding part and the contact target part are in contact with each other when the outer door is rotated in a closing direction with the inner door open.

In addition, a recording apparatus according to the present disclosure includes the medium conveyance apparatus according to any one of first to seventh aspects described later, and a recording unit configured to perform recording on the medium conveyed from the medium conveyance apparatus.

DESCRIPTION OF EMBODIMENTS

Figure 1:
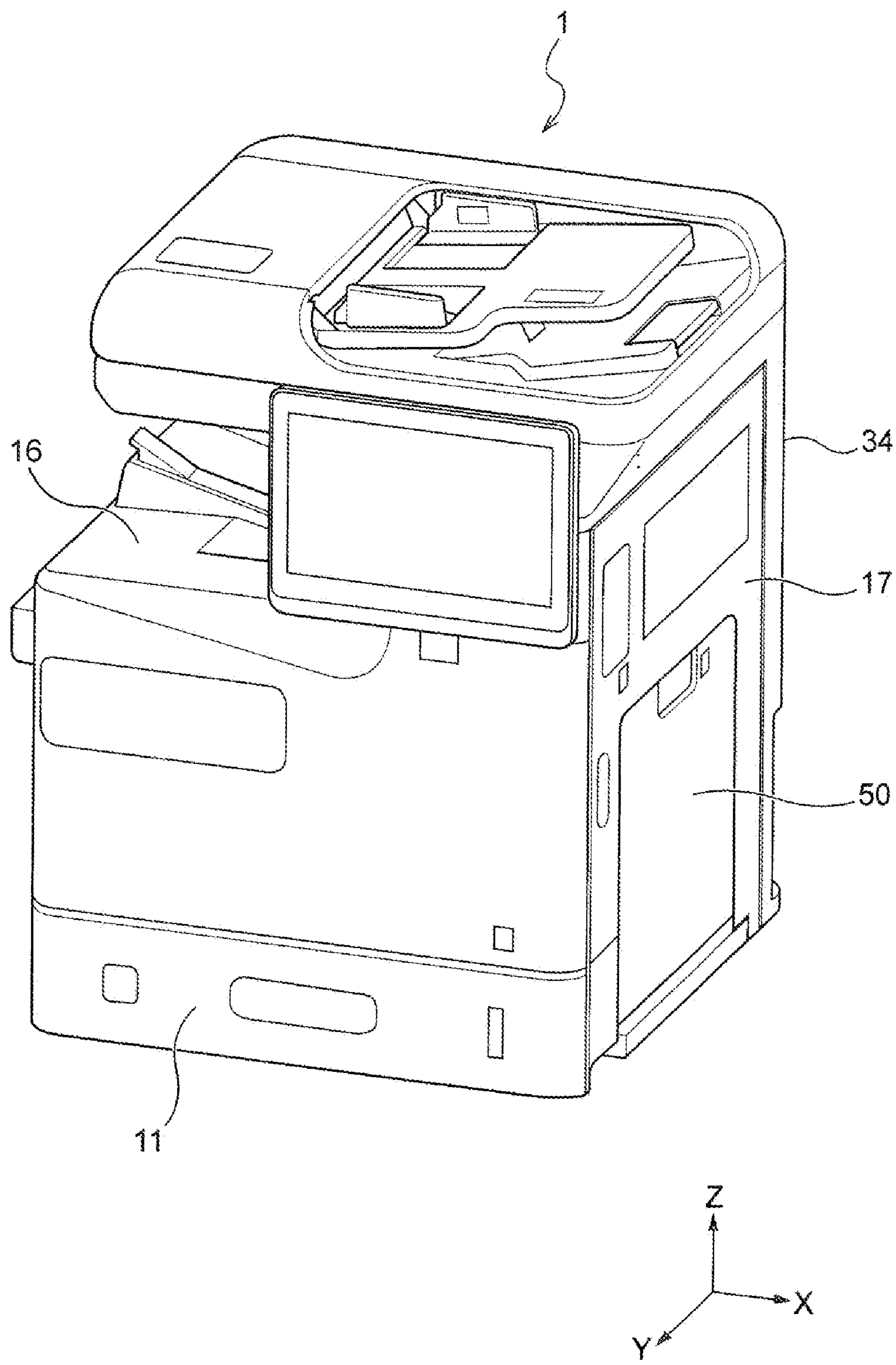
FIG. 1 is a perspective view illustrating an external appearance of a recording apparatus according to a first embodiment.
Figure 2:
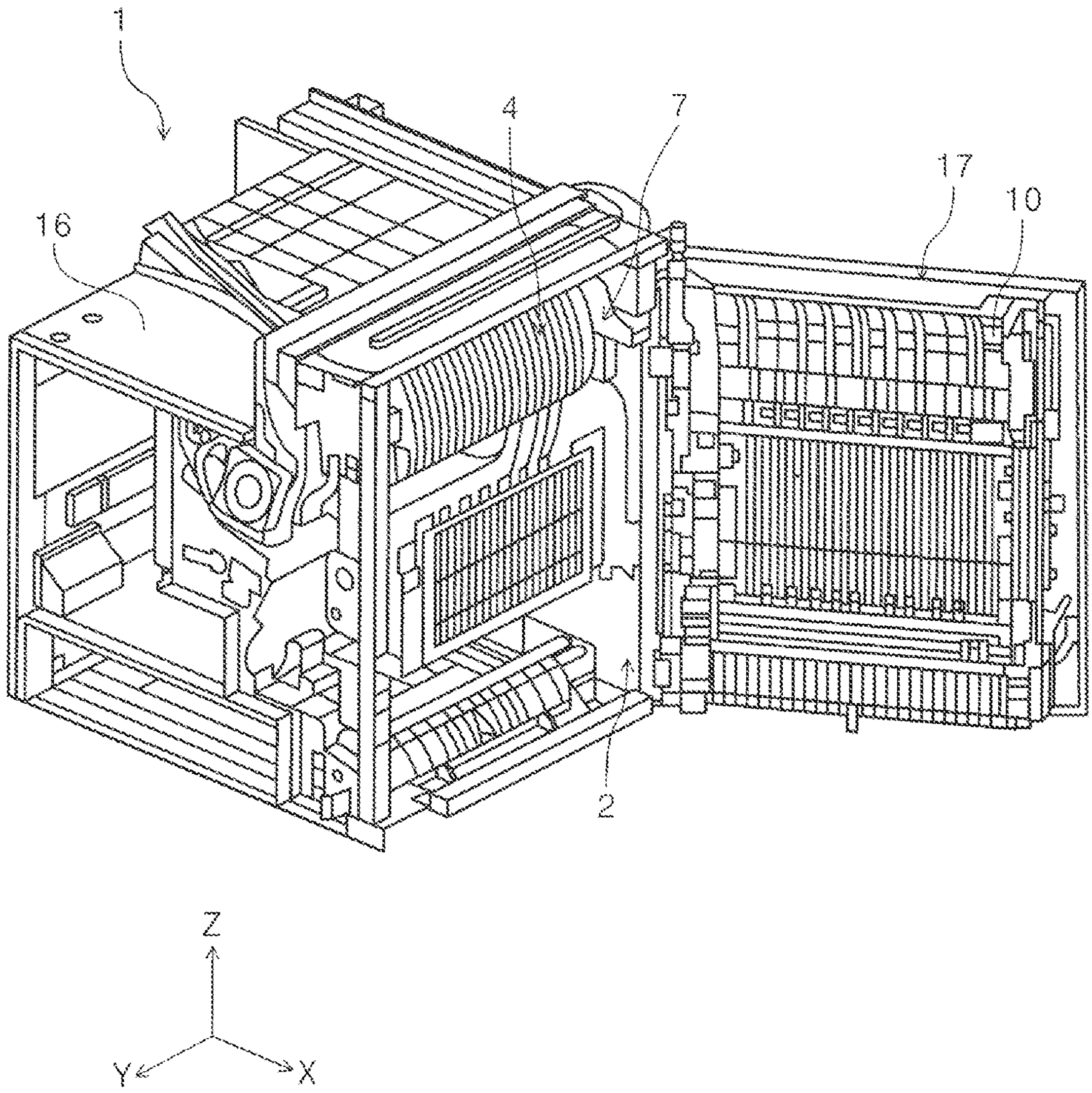
FIG. 2 is a schematic perspective view illustrating a state where an outer door is open in the first embodiment.

First, the present disclosure is schematically described below.

To solve the above-mentioned problems, a medium conveyance apparatus according to a first aspect of the present disclosure includes an inner door openable and closable with respect to an apparatus body, an outer door located on an outer side of the inner door and openable and closable with respect to the apparatus body, and a first conveyance path formed in a region between the inner door and the outer door in a state where the inner door and the outer door are closed, the first conveyance path being configured to convey a medium, in which one of the inner door and the outer door includes a contact protruding part, the other of the inner door and the outer door includes a contact target part configured to come into contact with the contact protruding part, and the contact protruding part and the contact target part are disposed forming a gap in the region between the inner door and the outer door in a state where the contact protruding part and the contact target part are in contact with each other when the outer door is rotated in a closing direction with the inner door open.

According to this aspect, one of the inner door and the outer door is provided with the contact protruding part, and the other of the inner door and the outer door is provided with the contact target part. Further, when the outer door is rotated in the closing direction with the inner door open, the contact protruding part and the contact target part come into contact with each other first, and a gap is formed in the region between the inner door and the outer door in that contact state. With this gap, the outer surface of the inner door and the inner surface of the outer door do not come into contact with each other and moreover no rubbing occurs, which can reduce the risk of damage to one or both of the outer surface of the inner door and the inner surface of the outer door.

The medium conveyance apparatus according to a second aspect of the present disclosure is an aspect depending on the first aspect, in which the first conveyance path is provided with a medium conveyance supporting member configured to support the medium conveyed.

When the medium conveyance supporting member such as the driving roller, the driven roller with a toothed structure, and a guide rib (not illustrated) for guiding the conveyance of the medium is provided in the first conveyance path, the damage due to the contact and rubbing is large.

It can be said that when this aspect is applied to the medium conveyance apparatus including the first conveyance path with such a structure, the resulting effects are remarkable.

The medium conveyance apparatus according to a third aspect of the present disclosure is an aspect depending on the second aspect, further including a second conveyance path formed between the inner door and the apparatus body in a state where the inner door is closed, the second conveyance path being configured to convey the medium, in which the inner door and the outer door are opened and closed by being horizontally rotated about rotation shafts as rotation fulcrums, respectively. Note that this aspect may also depend on the first aspect.

In addition, in the medium conveyance apparatus including the second conveyance path between the inner door and the apparatus body, the frequency of opening the inner door is likely to be increased. It can be said that when this aspect is applied to the medium conveyance apparatus including the second conveyance path with such a structure, the resulting effects are remarkable.

The medium conveyance apparatus according to a fourth aspect of the present disclosure is an aspect depending on the third aspect, in which the contact target part includes a slide surface located at an upper portion of the outer door and provided extending in a direction intersecting a conveyance direction of the medium, the contact protruding part slides toward a free end of the outer door after coming into contact with the slide surface, and the contact protruding part is located outside a sliding range of the slide surface in the state where the inner door is closed.

According to this aspect, the contact target part includes the slide surface located in an upper portion of the outer door, and the contact protruding part slides toward the free end of the outer door after coming into contact with the slide surface. Specifically, when the outer door is pushed in the closing direction, the contact protruding part comes into contact with the contact target part and the inner door also rotates in the closing direction while maintaining the contact state, thus maintaining the gap. In this manner, the risk of the damage to the outer surface of the inner door and the inner surface of the outer door can be reduced with a simple structure such as the slide surface.

The medium conveyance apparatus according to a fifth aspect of the present disclosure is an aspect depending on the fourth aspect, in which the slide surface includes a first protruding and recessed part constituting a part of the first conveyance path, the contact protruding part has a width greater than a maximum width of first recesses of the first protruding and recessed part, and the contact protruding part sequentially comes into contact with first protrusions of the first protruding and recessed part when sliding.

According to this aspect, since the slide surface serving as the contact target part has the structure using the first protruding and recessed part making up a part of the first conveyance path, the contact target part can be easily provided without increasing the number of components.

In addition, the contact protruding part has a width greater than the maximum width of the first recess of the first protruding and recessed part, and slides by sequentially coming into contact with the first protrusion of the first protruding and recessed part. In this manner, the contact protruding part can stably slide on the slide surface.

The medium conveyance apparatus according to a sixth aspect of the present disclosure is an aspect depending on the fifth aspect, in which the apparatus body includes a second protruding and recessed part constituting the first conveyance path, and in a state where the outer door is closed, a first conveyance path of the outer door and a first conveyance path of the apparatus body are coupled to each other by a first protrusion of the first protrusions of the first protruding and recessed part entering a second recess of the second protruding and recessed part and a first recess of the first recesses of the first protruding and recessed part entering a second protrusion of the second protruding and recessed part. Note that this aspect may also depend on any one of the first to fourth aspects.

According to this aspect, the first recess and the first protrusion of the first protruding and recessed part mutually enter the second protrusion and the second recess of the second protruding and recessed part, and thus the first conveyance path of the outer door and the first conveyance path of the apparatus body are coupled to each other. That is, the first protruding and recessed part in the portion coupling the first conveyance path on the outer door side and the first conveyance path on the apparatus body side is used as the contact target part. In this manner, the effects of reducing the risk of the damage by effectively using existing structures can be achieved.

The medium conveyance apparatus according to a seventh aspect of the present disclosure is an aspect depending on the fifth aspect, in which in a first protrusion of the first protrusions of the first protruding and recessed part, a side farther from the rotation shaft protrudes more than a side closer to the rotation shaft. Note that this aspect may also depend on any one of the third, fourth, or sixth aspects.

According to this aspect, in the first protrusion of the first protruding and recessed part, the side farther from the rotation shaft protrudes more than the side closer to the rotation shaft. In this manner, when the contact protruding part slides by sequentially coming into contact with the first protrusion of the first protruding and recessed part, the risk of being caught by the first recess can be reduced.

A recording apparatus according to an eighth aspect of the present disclosure is a recording apparatus configured to perform recording on a medium conveyed by a medium conveyance apparatus, in which the medium conveyance apparatus is the medium conveyance apparatus according to any one of the first to seventh aspects.

According to this aspect, as a recording apparatus, the effects of the aspects of the medium conveyance apparatus can be achieved.

EMBODIMENTS

An embodiment of a medium conveyance apparatus according to the present disclosure and a recording apparatus such as an ink-jet printer including the medium conveyance apparatus are described in detail below with reference to the drawings.

In the following description, three axes orthogonal to each other are the X-axis, the Y-axis, and the Z-axis as illustrated in the drawings. The directions of the arrows of the three axes (X, Y, Z) are the + direction of respective directions, and the direction opposite to the + direction is the − direction. The Z-axis direction is the vertical direction, i.e., the direction in which the gravity acts, the +Z direction indicates the vertically upward direction, and the −Z direction indicates the vertically downward direction. The X-axis direction and the Y-axis direction correspond to horizontal directions. The +Y direction indicates the front direction of the apparatus, and the −Y direction indicates the rear direction of the apparatus. The +X direction indicates the right direction of the apparatus, and the −X direction indicates the left direction of the apparatus.

First Embodiment

Recording Apparatus

A recording apparatus 1 of this embodiment is, for example, an ink-jet printer.

As illustrated in FIG. 1, the recording apparatus 1 includes a medium conveyance apparatus 7 (FIG. 7) that conveys a medium 3 such as sheets housed in a medium housing part 11 (FIG. 6) and/or the medium 3 placed on a placement tray 50, a recording unit (not illustrated) that performs recording on the medium 3 conveyed by the medium conveyance apparatus 7, and an ejection tray 16 to which the medium 3 recorded at the recording unit is ejected.

The recording apparatus 1 is provided with an outer door 17 that is openable and closable in a state where the outer door 17 constitutes a part of a housing 34 making up the external appearance of the apparatus. The placement tray 50 is provided at the outer door 17.

The recording operation on the medium 3 at the recording unit and the conveyance operation for the medium 3 at the medium conveyance apparatus 7 are performed by a control unit (not illustrated). Here, the control unit includes a CPU, a flash ROM, and a RAM. The CPU performs various arithmetic processing in accordance with a program stored in the flash ROM, and controls the entire operation of the recording apparatus 1. The flash ROM serving as an example of a storage unit is a readable and rewritable nonvolatile memory. The RAM serving as an example of a storage unit temporarily stores a variety of information.

Medium Conveyance Apparatus

As illustrated in FIGS. 2 to 10, in this embodiment, the medium conveyance apparatus 7 includes an inner door 4 openable and closable with respect to the apparatus body 2 of the recording apparatus 1, and the outer door 17 located on an outer side of the inner door 4 and openable and closable with respect to the apparatus body 2. In the state where the inner door 4 and the outer door 17 are closed (FIGS. 1 and 9), a first conveyance path 6 is formed in a region 8 (FIG. 6) between the inner door 4 and the outer door 17. The first conveyance path 6 is a path for recording on the medium 3 through a recording execution region of the recording unit, or a path for conveying the medium 3 to an inversion path (not illustrated) for performing duplex recording.

As is clear from FIGS. 2, 3, 5, and 6, in this embodiment, a part of the first conveyance path 6 is formed by a convex surface on the inner door 4 side and a curved concave surface on the outer door 17 side facing each other.

Figure 5:
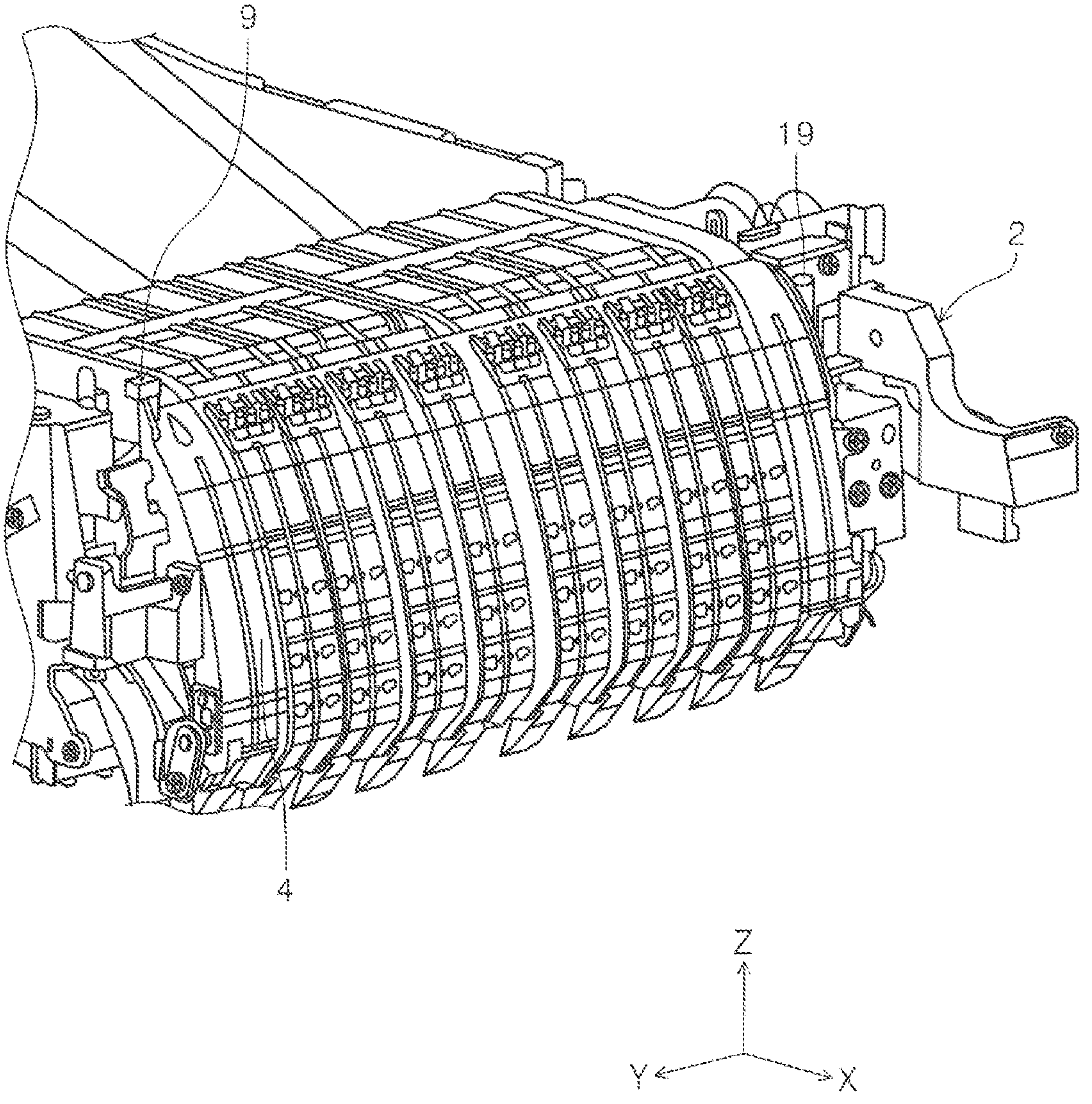
FIG. 5 is a perspective view illustrating a portion of the inner door in the first embodiment.
Figure 6:
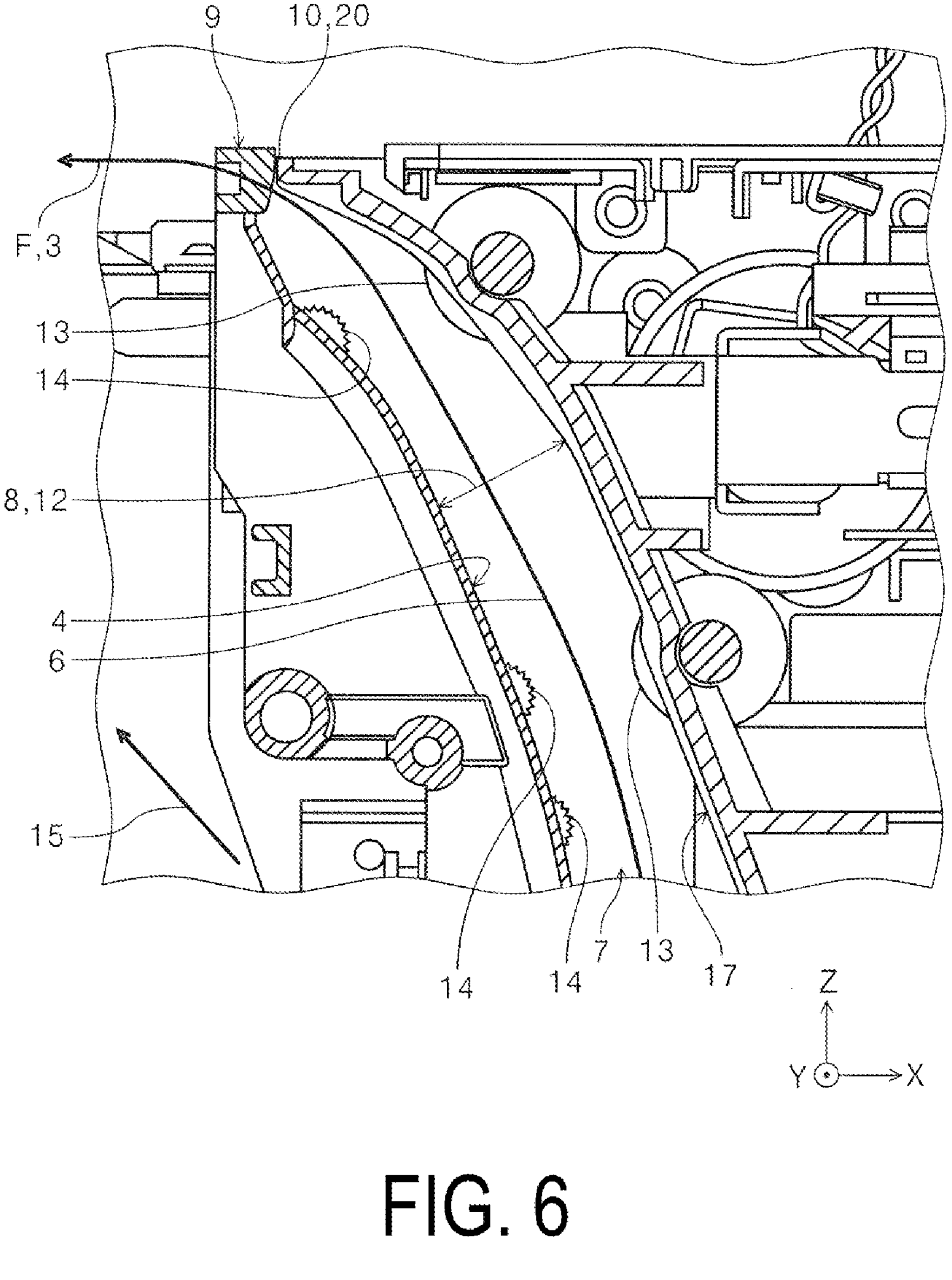
FIG. 6 is a side sectional view illustrating a main part in the first embodiment.

As illustrated in FIGS. 5 to 9, in this embodiment, the inner door 4 includes a contact protruding part 9. The outer door 17 includes a contact target part 10 contacted by the contact protruding part 9. Further, the contact protruding part 9 and the contact target part 10 are disposed such that when the outer door 17 is rotated in the closing direction with the inner door 4 open, a gap 12 is formed in the region 8 between the inner door 4 and the outer door 17 with the contact protruding part 9 and the contact target part 10 in contact with each other as illustrated in FIG. 6.

In FIG. 6, the first conveyance path 6 is a path that is formed in the state where the contact protruding part 9 is moved to the position (FIG. 9) where the contact protruding part 9 is out of contact with the contact target part 10, and a driving roller 13 and a toothed driven roller 14 are brought close to each other until coming into contact with each other.

In this embodiment, the first conveyance path 6 is provided with a medium conveyance supporting unit that supports the medium 3 conveyed. Here, the medium conveyance supporting unit is the driving roller 13 and the driven roller 14, but may be provided with a guide rib for guiding the conveyance of the medium 3 and the like. The guide rib and the like form the medium conveyance supporting unit.

This embodiment further includes a second conveyance path 15 formed between the inner door 4 and the apparatus body 2 in a state where the inner door 4 is closed, the second conveyance path 15 being configured to convey the medium. The second conveyance path 15 is located at the position indicated by an arrow 15 in FIG. 6 when the inner door 4 is closed, and a medium jam in the second conveyance path 15 and the like can be dealt with by opening the inner door 4.

Figure 3:
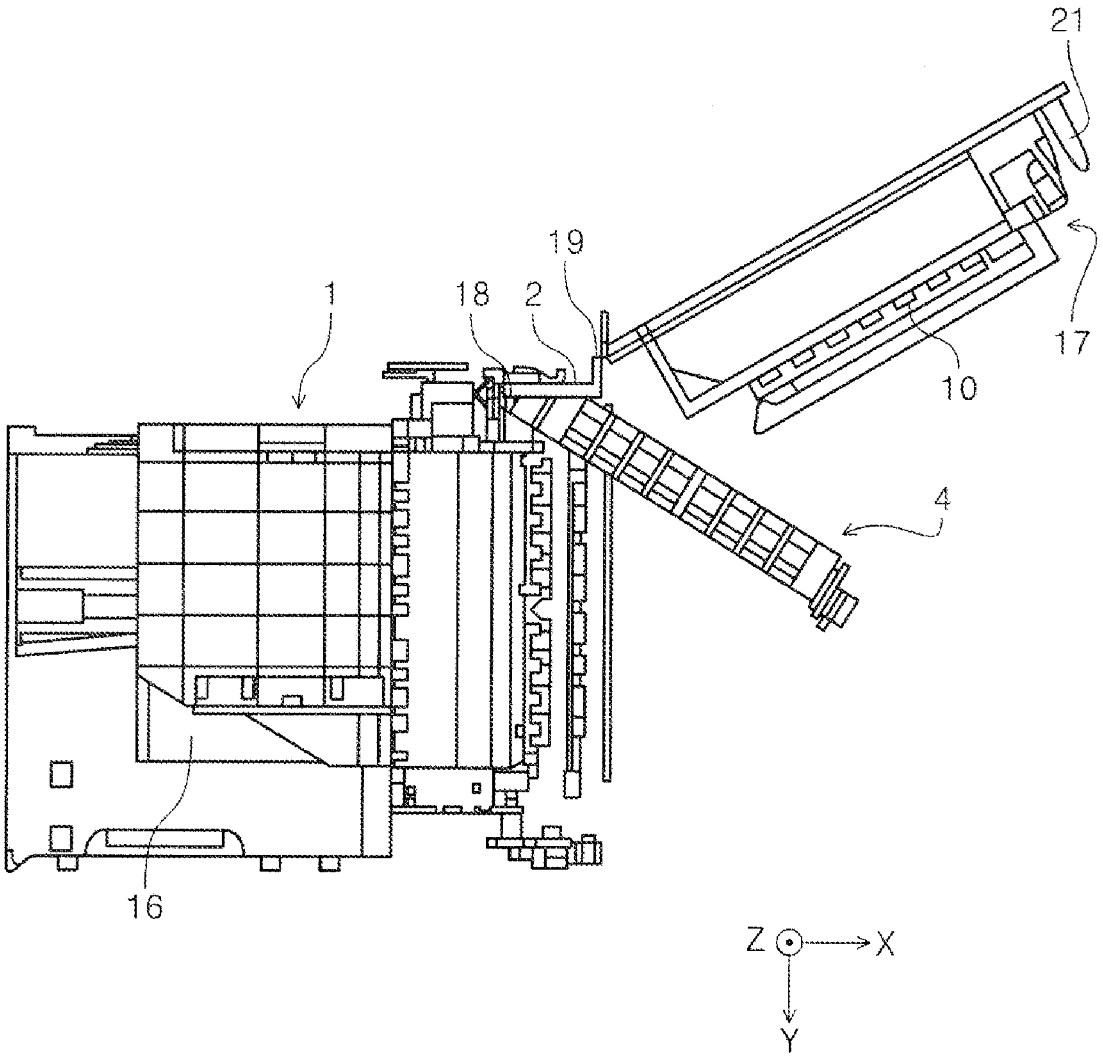
FIG. 3 is a plan view illustrating a state where the outer door and an inner door are open in the first embodiment.

As illustrated in FIG. 3, the inner door 4 and the outer door 17 are attached such that they are opened and closed by being horizontally rotated about rotation shafts 18 and 19 as rotation fulcrums, respectively, i.e., the inner door 4 and the outer door 17 are both laterally opened and closed.

In this embodiment, the contact target part 10 is located in an upper portion of the outer door 17 as illustrated in FIGS. 5 and 6. Further, the contact target part 10 includes a slide surface 20 provided extending in a direction (Y-axis direction) intersecting a conveyance direction F (FIG. 6) of the medium 3 as illustrated in FIGS. 6 to 9.

After coming into contact with the slide surface 20, the contact protruding part 9 slides toward a free end 21 (FIGS. 3, 4, and 7) of the outer door 17 while moving in the closing direction of the inner door 4 along with the rotation of the outer door 17 in the closing direction. In a state where the inner door 4 is closed, the contact protruding part 9 is located outside the sliding range of the slide surface 20 as illustrated in FIG. 9.

Figure 7:
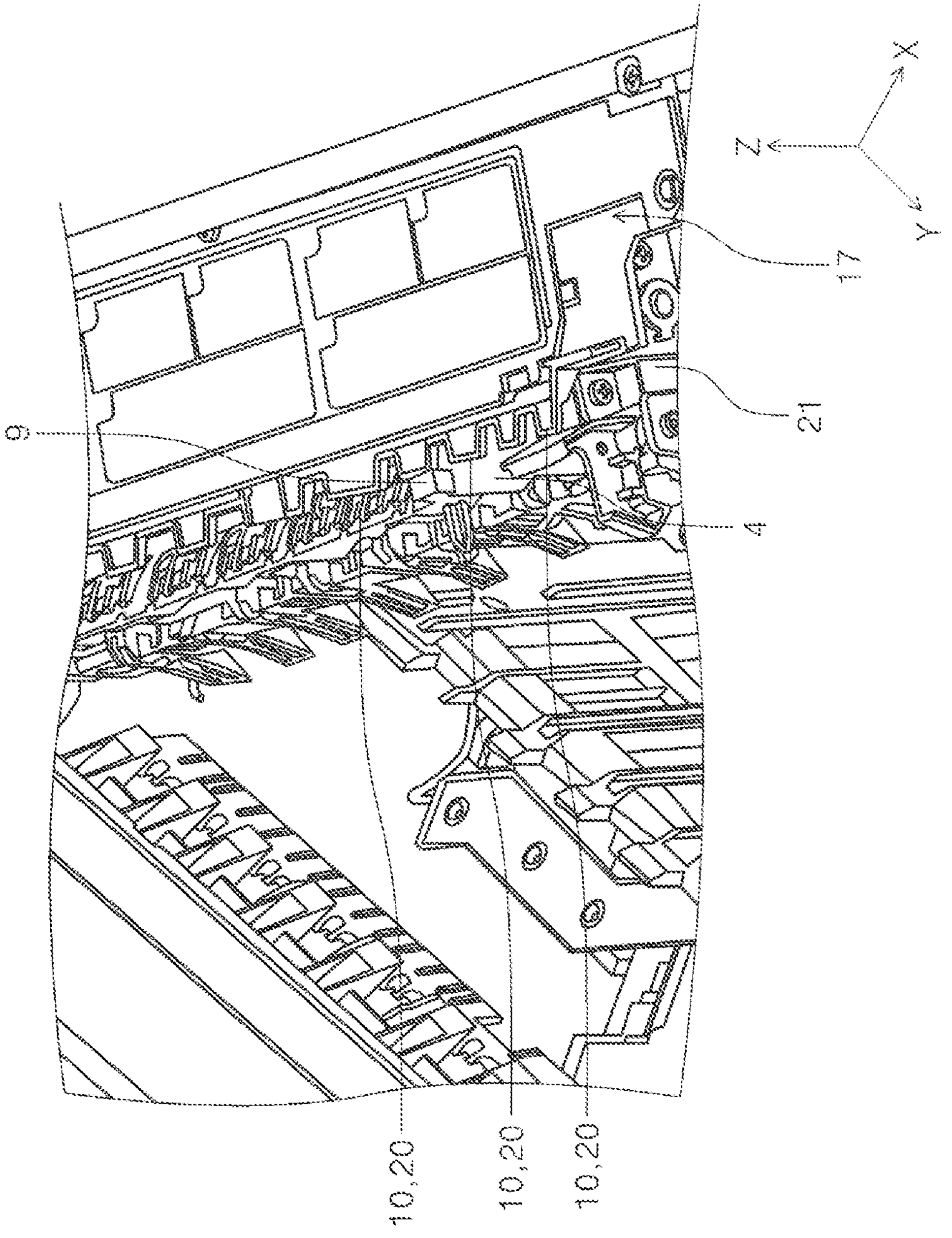
FIG. 7 is a perspective view illustrating a main part in the first embodiment.
Figure 8:
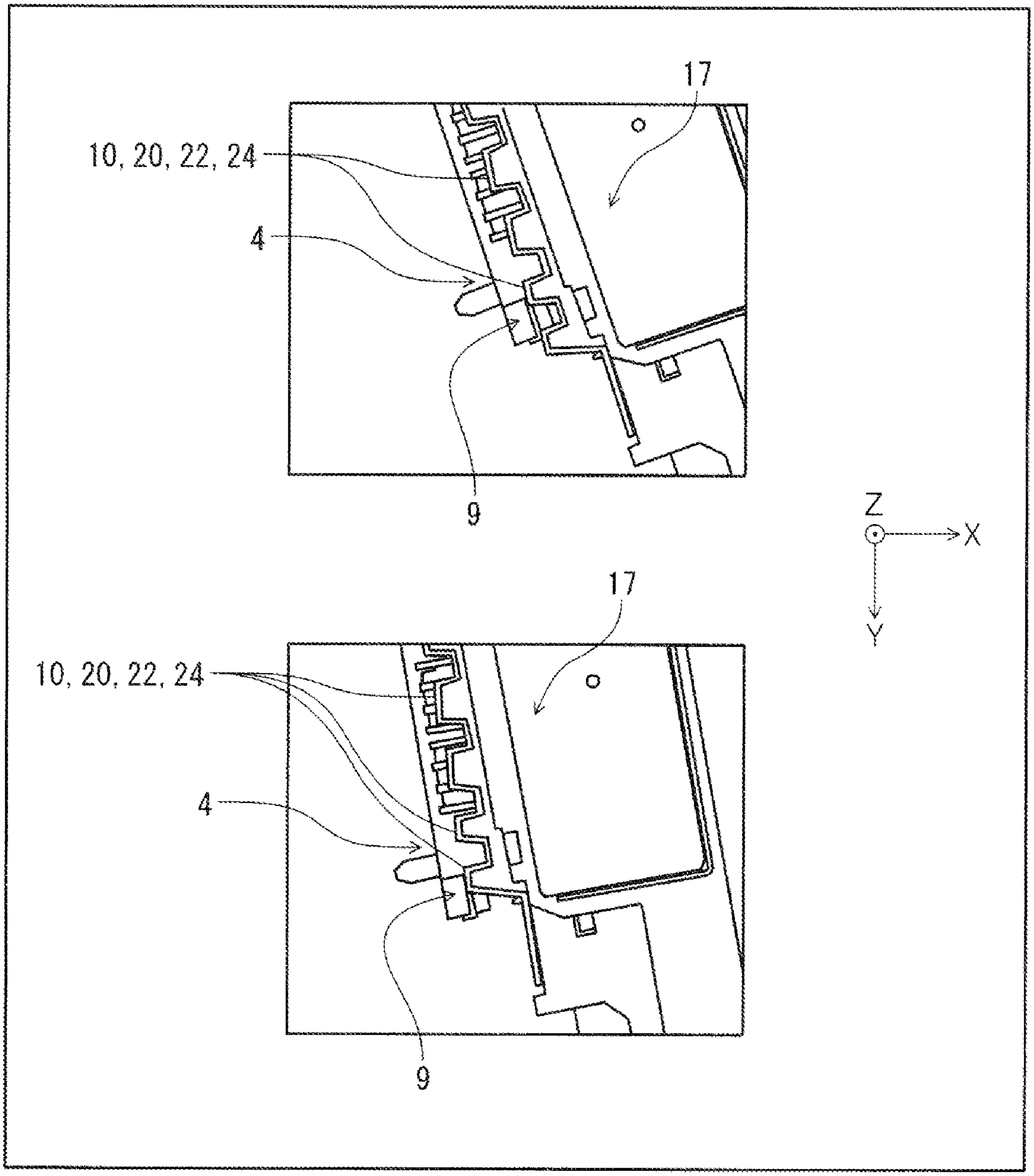
FIG. 8 is a plan view illustrating of a main part for describing a slide movement when closing the outer door and the inner door in the first embodiment.
Figure 9:
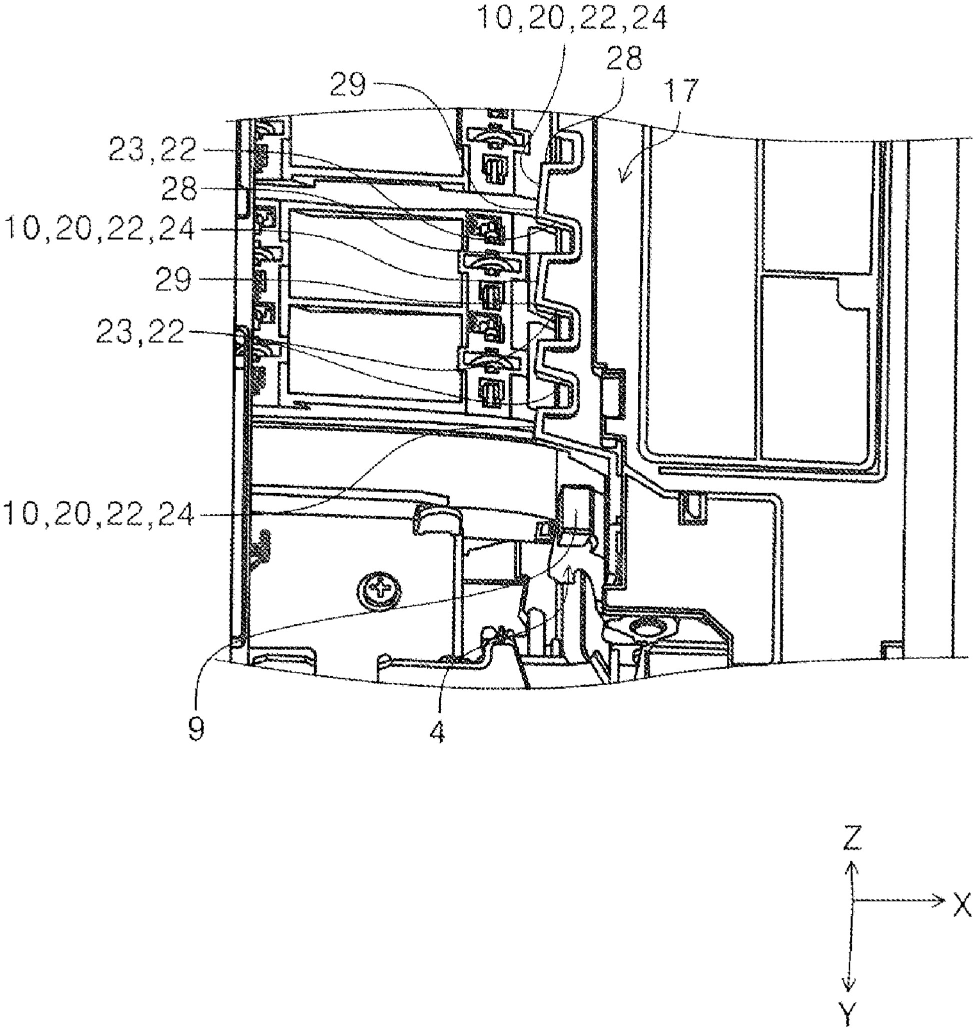
FIG. 9 is a perspective view illustrating a main part of the outer door and the inner door in a closed state in the first embodiment.

In this embodiment, the slide surface 20 includes a first protruding and recessed part 22 that makes up a part of the first conveyance path 6 as illustrated in FIGS. 7 to 9. The first protruding and recessed part 22 includes a plurality of first protrusions 24 and a plurality of first recesses 23. Here, the plurality of first protrusions 24 and the plurality of first recesses 23 are both composed of protrusions having different shapes, and not of protrusions having the same shape. Note that all or some of the plurality of first protrusions 24 and the plurality of first recesses 23 may have the same shapes.

The contact protruding part 9 is formed to have a width greater than the width of a recessed groove with a maximum width among the plurality of first recesses 23 (FIG. 9) of the first protruding and recessed part 22. That is, the width of the contact protruding part 9 is greater than the maximum width of the first recess 23 such that the contact protruding part 9 does not fall into the first recess 23. In this manner, the contact protruding part 9 slides in the direction of the free end 21 by sequentially coming into contact with the first protrusion 24 (FIG. 9) of the first protruding and recessed part 22.

Figure 10:
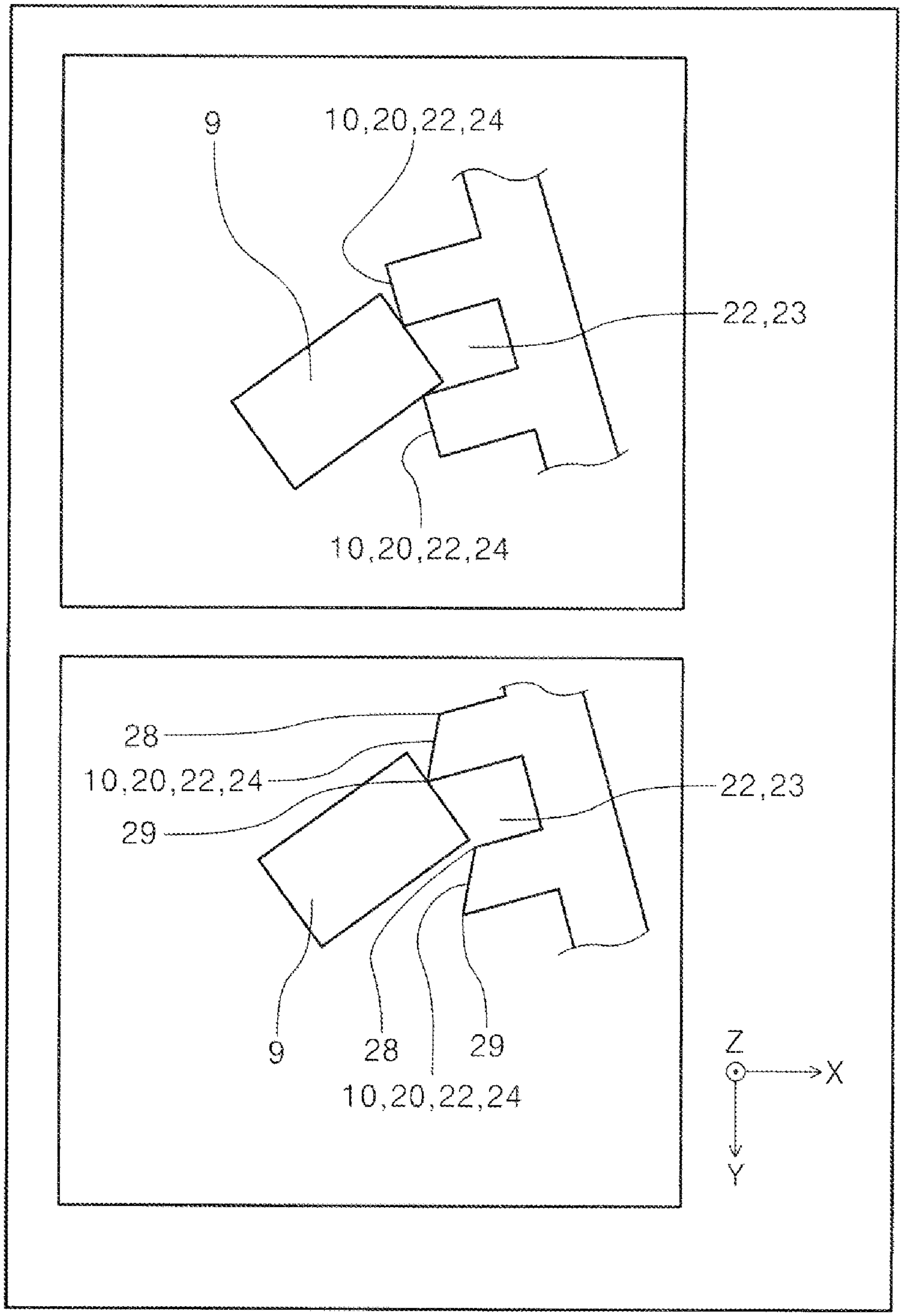
FIG. 10 is a schematic view illustrating a contact part of the outer door and the inner door when closing the outer door and the inner door in the first embodiment.

In this embodiment, as illustrated in FIG. 9 and the lower diagram of FIG. 10, the first protrusion 24 forming the slide surface 20 of the first protruding and recessed part 22 is formed such that a side 29 farther from the rotation shaft 19 of the outer door 17 protrudes more than a side 28 closer to the rotation shaft 19.

The upper diagram of FIG. 10 illustrates a structure in which the above-described protrusion is not provided. It is clear that the contact protruding part 9 may be caught by the first recess 23 during the slide movement in the structure of the upper diagram of FIG. 10, while the contact protruding part 9 is less caught by the first recess 23 in the structure of the lower diagram of FIG. 10.

Figure 11:
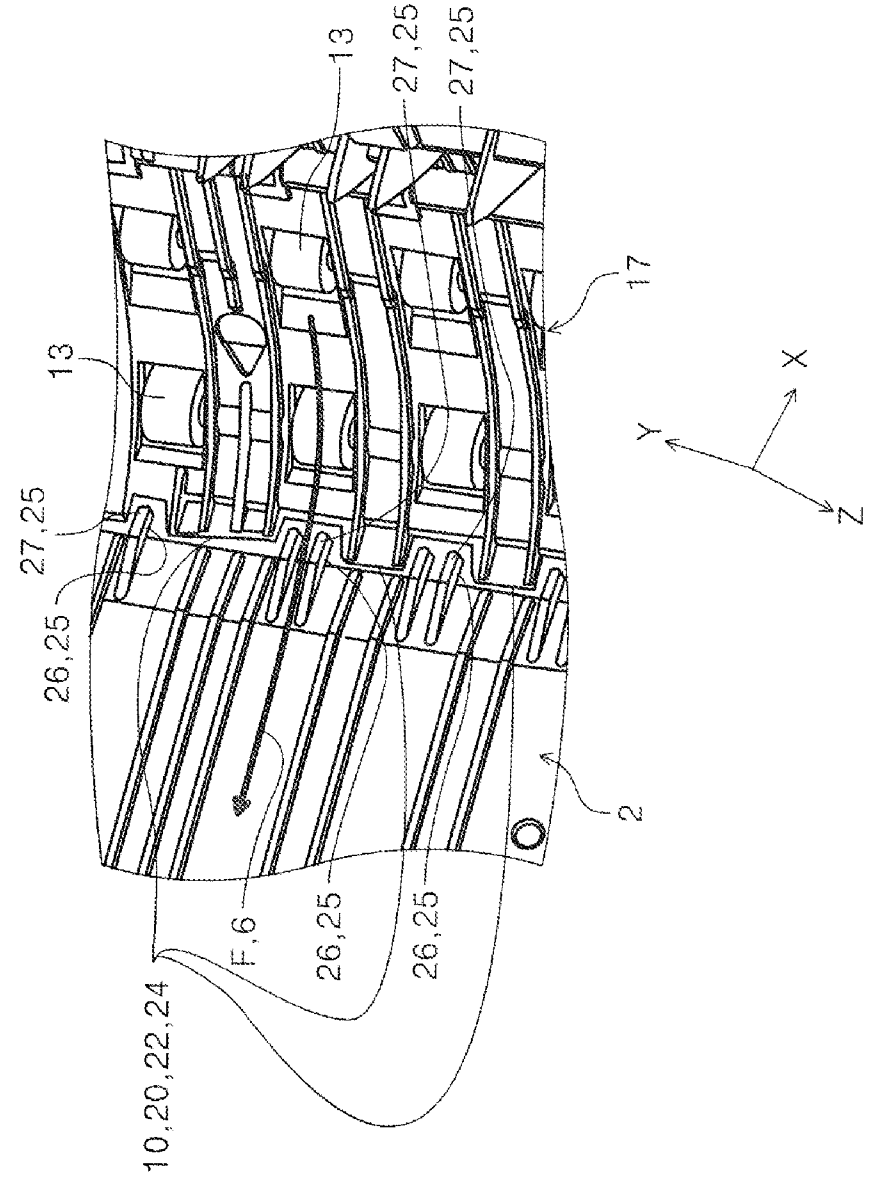
FIG. 11 is an enlarged perspective view illustrating a main part in the first embodiment.

As illustrated in FIG. 11, in this embodiment, the apparatus body 2 includes a second protruding and recessed part 25 located downstream of the driving roller 13 in the medium conveyance direction and making up the first conveyance path 6. In the state where the outer door 17 is closed, the first protrusion 24 of the first protruding and recessed part 22 enters a second recess 26 of the second protruding and recessed part 25, and a second protrusion 27 of the second protruding and recessed part 25 enters the first recess 23 of the first protruding and recessed part 22, and thus the first conveyance path 6 of the outer door 17 and the first conveyance path 6 of the apparatus body 2 are coupled to each other.

Operation of First Embodiment

A case where a jam of the medium 3 occurs in the second conveyance path 15 of the medium conveyance apparatus 7 is described below. First, in the state of FIG. 1, the outer door 17 is opened to set the state of FIG. 2, and further the inner door 4 is opened to set the state of FIG. 3. Then, the user deals with the medium jam in the second conveyance path 15 exposed in an accessible manner. With respect to a case where the user then rotates the outer door 17 in the closing direction with the inner door 4 still open, a case where the contact protruding part 9 is not provided (FIG. 4) and a case where the contact protruding part 9 is provided (FIGS. 5 to 9) are separately described.

Figure 4:
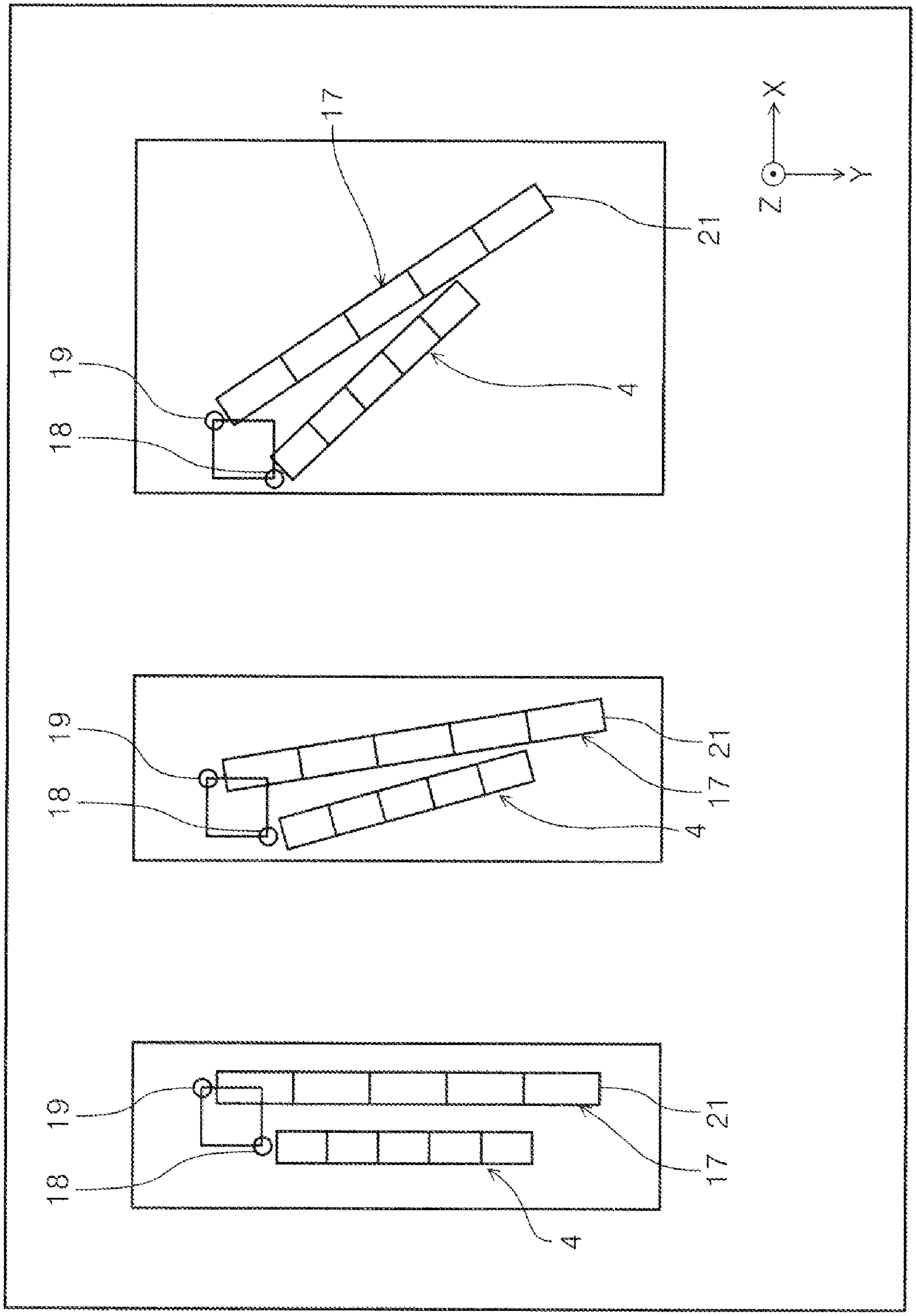
FIG. 4 is a schematic view illustrating contact behaviors of the outer door and the inner door when closing the outer door and the inner door.

(1) In the former case where the contact protruding part 9 is not provided, the outer door 17 moves in the closing direction with the inner door 4 stopped, and therefore the opposite portions of the inner door 4 and the outer door 17 come into contact with each other as illustrated in the right diagram of FIG. 4. When the outer door 17 is moved in the same direction in this state as illustrated in the center diagram of FIG. 4, rubbing occurs at the contact portions therebetween. Finally, the inner door 4 and the outer door 17 are set to a closed state as illustrated in the left diagram of FIG. 4, but due to the contact and rubbing described above, one or both of the outer surface of the inner door 4 and the inner surface of the outer door 17 may be damaged.

(2) In the latter case where the contact protruding part 9 is provided, i.e., in this embodiment, when the outer door 17 moves in the closing direction with the inner door 4 stopped, the contact protruding part 9 provided in the inner door 4 comes into contact with the contact target part 10 of the outer door 17 side as illustrated in FIG. 7. In this state, there is the gap 12 in the region 8 between the inner door 4 and the outer door 17 as illustrated in FIG. 6, and thus their opposing portions are separated from each other without coming into contact with each other. That is, neither the inner door 4 nor the outer door 17 are damaged by the contact.

Further, when the outer door 17 is moved in the closing direction in this state, the contact protruding part 9 slides while being in contact with the contact target part 10, i.e., the contact protruding part 9 slides on the slide surface 20, and moves in the direction of the free end 21 of the outer door 17. During this, the gap 12 is maintained. Then, immediately before the inner door 4 is closed with respect to the apparatus body 2, the contact protruding part 9 reaches the outside of the sliding range of the slide surface 20 to come out of contact with the contact target part 10 (FIG. 9). In this manner, the outer door 17 can be closed with respect to the apparatus body 2, and is brought to the closed state illustrated in FIGS. 1 and 9. That is, the inner door 4 and the outer door 17 are brought to the closed state without sustaining damage due to the rubbing.

Effects of First Embodiment (1) In this embodiment, the inner door 4 is provided with the contact protruding part 9, and the outer door 17 is provided with the contact target part 10. Further, the contact protruding part 9 and the contact target part 10 are disposed such that when the outer door 17 is rotated in the closing direction with the inner door 4 open, the contact protruding part 9 and the contact target part 10 come into contact with each other first, and the gap 12 is formed in the region 8 between the inner door 4 and the outer door 17 in that contact state. With the gap 12, the outer surface of the inner door 4 and the inner surface of the outer door 17 do not come into contact with each other and moreover no rubbing occurs, which can reduce the risk of damage to one or both of the outer surface of the inner door 4 and the inner surface of the outer door 17.

(2) In addition, when the medium conveyance supporting member (13, 14) such as the driving roller 13, the driven roller 14 with a toothed structure, and a guide rib (not illustrated) for guiding the conveyance of the medium 3 is provided in the first conveyance path 6, the damage due to the contact and rubbing is large.

When this embodiment is applied to the medium conveyance apparatus 7 including the first conveyance path 6 with such a structure, the resulting effects are remarkable.

(3) In addition, in the medium conveyance apparatus 7 including the second conveyance path 15 between the inner door 4 and the apparatus body 2, the frequency of opening the inner door 4 is likely to be increased. When this embodiment is applied to the medium conveyance apparatus 7 including the second conveyance path 15 with such a structure, the resulting effects are remarkable.

(4) In addition, in this embodiment, the contact target part 10 includes the slide surface 20 located in an upper portion of the outer door 17, and the contact protruding part 9 slides toward the free end 21 of the outer door 17 after coming into contact with the slide surface 20. Specifically, when the outer door 17 is pushed in the closing direction, the contact protruding part 9 comes into contact with the contact target part 10 and the inner door 4 also rotates in the closing direction while maintaining the contact state, thus maintaining the gap 12. In this manner, the risk of the damage to the outer surface of the inner door 4 and the inner surface of the outer door 17 can be reduced with a simple structure such as the slide surface 20.

(5) In addition, in this embodiment, since the slide surface 20 serving as the contact target part 10 has the structure using the first protruding and recessed part 22 making up a part of the first conveyance path 6, the contact target part 10 can be easily provided without increasing the number of components.

In addition, the contact protruding part 9 has a width greater than the maximum width of the first recess 23 of the first protruding and recessed part 22, and slides by sequentially coming into contact with the first protrusion 24 of the first protruding and recessed part 22. In this manner, the contact protruding part 9 can stably slide on the slide surface 20.

(6) In addition, in this embodiment, the first recess 23 and the first protrusion 24 of the first protruding and recessed part 22 mutually enter the second protrusion 27 and the second recess 26 of the second protruding and recessed part 25, and thus the first conveyance path 6 of the outer door 17 and the first conveyance path 6 of the apparatus body 2 are coupled to each other. That is, the first protruding and recessed part 22 in the portion coupling the first conveyance path 6 on the outer door 17 side and the first conveyance path 6 on the apparatus body 2 side is used as the contact target part 10. In this manner, the effects of reducing the risk of the damage by effectively using existing structures can be achieved.

(7) In addition, in this embodiment, in the first protrusion 24 of the first protruding and recessed part 22, the side 29 farther from the rotation shaft 19 protrudes more than the side 28 closer to the rotation shaft 19. In this manner, when the contact protruding part 9 slides by sequentially coming into contact with the first protrusion 24 of the first protruding and recessed part 22, the risk of being caught by the first recess 23 can be reduced.

OTHER EMBODIMENTS

The medium conveyance apparatus 7 and the recording apparatus 1 including the medium conveyance apparatus 7 according to the present disclosure basically have the configuration of the above-described embodiment, but it is of course possible to change or omit any part of the configuration without departing from the gist of the present disclosure.

The ink-jet printer including the medium conveyance apparatus 7 is described in the above-mentioned embodiment, but a configuration other than the printer may also be adopted. Specifically, the present disclosure is also applicable to other apparatuses including the medium conveyance apparatus 7 that conveys the medium 3.

In the above-mentioned embodiment, a case where the inner door 4 is provided with the contact protruding part 9 and the outer door 17 is provided with the contact target part 10 has been described, but the outer door 17 may be provided with the contact protruding part 9 and the inner door 4 may be provided with the contact target part 10.

In addition, the structure in which the contact protruding part 9 and the contact target part 10 are provided at the end portion of the upper portion of the inner door 4 and the outer door 17 is described above, but the arrangement position is not limited to the upper portion, and the arrangement position may be a middle portion or a lower portion.

In addition, while the structure of the slide surface 20 using the first protrusion 24 of the first protruding and recessed part 22 is described in the above-mentioned embodiment, this is not limitative. Naturally, the slide surface 20 may be provided portions other than the first protruding and recessed part 22, and a slide surface with a uniform flat shape may be adopted.

What is claimed is:

1. A medium conveyance apparatus comprising:

an inner door openable and closable with respect to an apparatus body;

an outer door located on an outer side of the inner door and openable and closable with respect to the apparatus body; and a first conveyance path formed in a region between the inner door and the outer door in a state where the inner door and the outer door are closed, the first conveyance path being configured to convey a medium, wherein one of the inner door and the outer door includes a contact protruding part, an other of the inner door and the outer door includes a contact target part configured to come into contact with the contact protruding part, and the contact protruding part and the contact target part are disposed forming a gap in the region between the inner door and the outer door in a state where the contact protruding part and the contact target part are in contact with each other when the outer door is rotated in a closing direction with the inner door open, the contact protruding part being outside a sliding range with the contact target part with the inner door and outer door are closed.

2. The medium conveyance apparatus according to claim 1, wherein the first conveyance path is provided with a medium conveyance supporting member configured to support the medium conveyed.

3. The medium conveyance apparatus according to claim 2, further comprising a second conveyance path formed between the inner door and the apparatus body in a state where the inner door is closed, the second conveyance path being configured to convey the medium, wherein the inner door and the outer door are opened and closed by being horizontally rotated about rotational shafts as rotation fulcrums, respectively.

4. The medium conveyance apparatus according to claim 3, wherein the contact target part includes a slide surface located at an upper portion of the outer door and provided extending in a direction intersecting a conveyance direction of the medium, the contact protruding part slides toward a free end of the outer door after coming into contact with the slide surface, and the contact protruding part is located outside a sliding range of the slide surface in the state where the inner door is closed.

5. The medium conveyance apparatus according to claim 4, wherein the slide surface includes a first protruding and recessed part constituting a part of the first conveyance path, the contact protruding part has a width greater than a maximum width of first recesses of the first protruding and recessed part, and the contact protruding part sequentially comes into contact with first protrusions of the first protruding and recessed part when sliding.

6. The medium conveyance apparatus according to claim 5, wherein the apparatus body includes a second protruding and recessed part constituting the first conveyance path and in a state where the outer door is closed, a first conveyance path of the outer door and a first conveyance path of the apparatus body are coupled to each other by a first protrusion of the first protrusions of the first protruding and recessed part entering a second recess of the second protruding and recessed part and a first recess of the first recesses of the first protruding and recessed part entering a second protrusion of the second protruding and recessed part.

7. The medium conveyance apparatus according to claim 5, wherein in a first protrusion of the first protrusions of the first protruding and recessed part, a side farther from the rotation shaft protrudes more than a side closer to the rotation shaft.

8. A recording apparatus configured to perform recording on a medium conveyed by a medium conveyance apparatus, wherein the medium conveyance apparatus is the medium conveyance apparatus according to claim 1.

* * * * *